United States Patent
Taka et al.

(10) Patent No.: US 6,185,377 B1
(45) Date of Patent: *Feb. 6, 2001

(54) APPARATUS SUCH AS CAMERA ADAPTED FOR FILM HAVING MAGNETIC RECORDING PART

(75) Inventors: Hideo Taka; Masaaki Ishihara, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/113,894

(22) Filed: Jul. 10, 1998

(30) Foreign Application Priority Data

Jul. 18, 1997 (JP) .................................................... 9-208332
Jul. 24, 1997 (JP) .................................................... 9-198588

(51) Int. Cl.[7] .............................. G03B 1/66; G03B 17/24
(52) U.S. Cl. ............................................. 396/284; 396/319
(58) Field of Search ...................................... 396/390, 297, 396/319, 284, 285, 292

(56) References Cited

U.S. PATENT DOCUMENTS 5,666,186 * 9/1997 Meyerhoefer et al. ............... 396/281
5,790,330 * 8/1998 Sugiyama ............................ 396/310
5,895,135 * 4/1999 Funaki ................................. 396/319

* cited by examiner

Primary Examiner—David M. Gray
(74) Attorney, Agent, or Firm—Robin, Blecker & Daley (57) ABSTRACT

An apparatus, such as a camera, adapted for a film having an information recording part includes a reading device which, when a partially used film reloaded into the apparatus is transported, reads out information recorded on the information recording part of the partially used film, and a display device which makes a display corresponding to the information read out by the reading device.

26 Claims, 9 Drawing Sheets

APPARATUS SUCH AS CAMERA ADAPTED FOR FILM HAVING MAGNETIC RECORDING PART

BACKGROUND OF THE INVENTION

1. Field of the Invention

The present invention relates to an apparatus, such as a camera, adapted for a film having a magnetic recording part, which is in a state of being used halfway for photo-taking only up to an intermediate frame portion thereof.

2. Description of Related Art

Some of cameras manufactured during recent years are adapted for use of a film cartridge having a disk-like indication part which is arranged to show, in bar codes, information on various exposure states of a film contained therein, such as "unused (unexposed)", "halfway (partially) exposed", "exposed" and "developed".

The camera of such a kind is arranged to rewind a halfway exposed film when a halfway-rewinding switch is turned on and to set the film exposure information of the above-stated indication part to the "halfway exposed" status position before the film cartridge is taken out from the camera. After that, when the camera is reloaded with the film cartridge which is set to show the "halfway exposed" state, the camera reads magnetic information recorded at every exposed frame, during transportation of the film. Upon detection of any frame that has no record of magnetic information, that frame is considered to be an unexposed frame and the film is then rewound to an extent as much as one frame portion, so that a photo-taking operation on the film can be resumed beginning with the forefront frame of unexposed frames. The camera thus enables the user to use different film cartridges for different purposes, so that photographs and film cartridges can be adequately correlated and arranged as desired.

However, when the number of such film cartridges that are taken out with the film halfway used becomes large, it tends to become difficult to make clear distinction among the film cartridges as to the photographs taken for different purposes or subjects. Such confusion tends to result in reuse of a wrong film cartridge for wrong purpose.

On this account, some of known cameras are arranged to enable the user to confirm the number of exposed frames by setting an ID number on each of the film cartridges. However, the different purposes or subjects of photographing can not be adequately discriminated from each other on the basis of only the number of exposed frames.

BRIEF SUMMARY OF THE INVENTION

In accordance with one aspect of the invention, there is provided an apparatus, such as a camera, adapted for a film having an information recording part, which comprises a reading device which, when a partially used film reloaded into the apparatus is transported, reads out information recorded on the information recording part of the partially used film, and a display device which makes a display corresponding to the information read out by the reading device, so that the user is enabled to readily know the status of a film as to what kind of pictures has been taken thereon when the film is taken out from the camera after it is only partially used.

The above and further aspects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
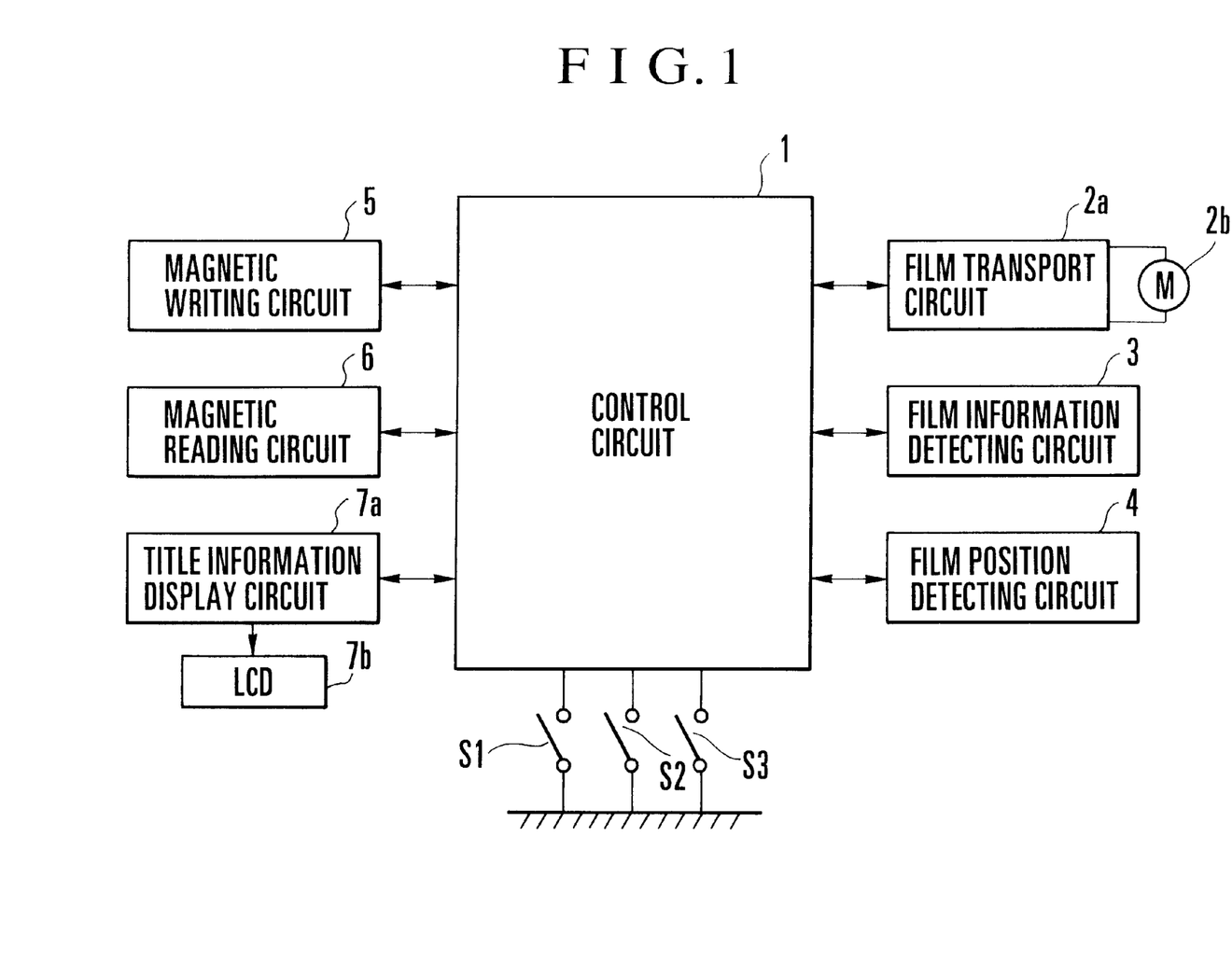
FIG. 1 is a block diagram showing in outline the circuit arrangement of a camera according to a first embodiment of the invention.

FIG. 1 is a block diagram showing the circuit arrangement of essential parts of a camera according to a first embodiment of the invention. Referring to FIG. 1, a control circuit 1 is composed of a microcomputer, etc. A film transport circuit 2a is arranged to drive a film transport motor 2b which transports forward and rewinds a film. A film information detecting circuit 3 is composed of a photo-reflector, etc., and is arranged to detect information of varied kinds about the film from a bar code information provided on an indication part formed in a disk-like shape on a film cartridge. A film position detecting circuit 4 is composed of a photo-reflector, etc., and is arranged to detect a fore end (leader) part of the film and the transported position of every frame of the film. A magnetic writing circuit 5 is arranged to write magnetic information on the film. A magnetic reading circuit 6 is arranged to read out magnetic information from the film. A title information display circuit 7a is arranged to display title information on a display device, for example, an LCD (a liquid crystal display device) 7b. Reference symbol S1 denotes a film presence-and-absence switch S1 which is arranged to turn on when the camera is loaded with the film cartridge. Reference symbol S2 denotes a release switch. Reference symbol S3 denotes a halfway-rewinding switch which is provided for rewinding the film halfway before the film is completely used for photo-taking.

Figure 2:
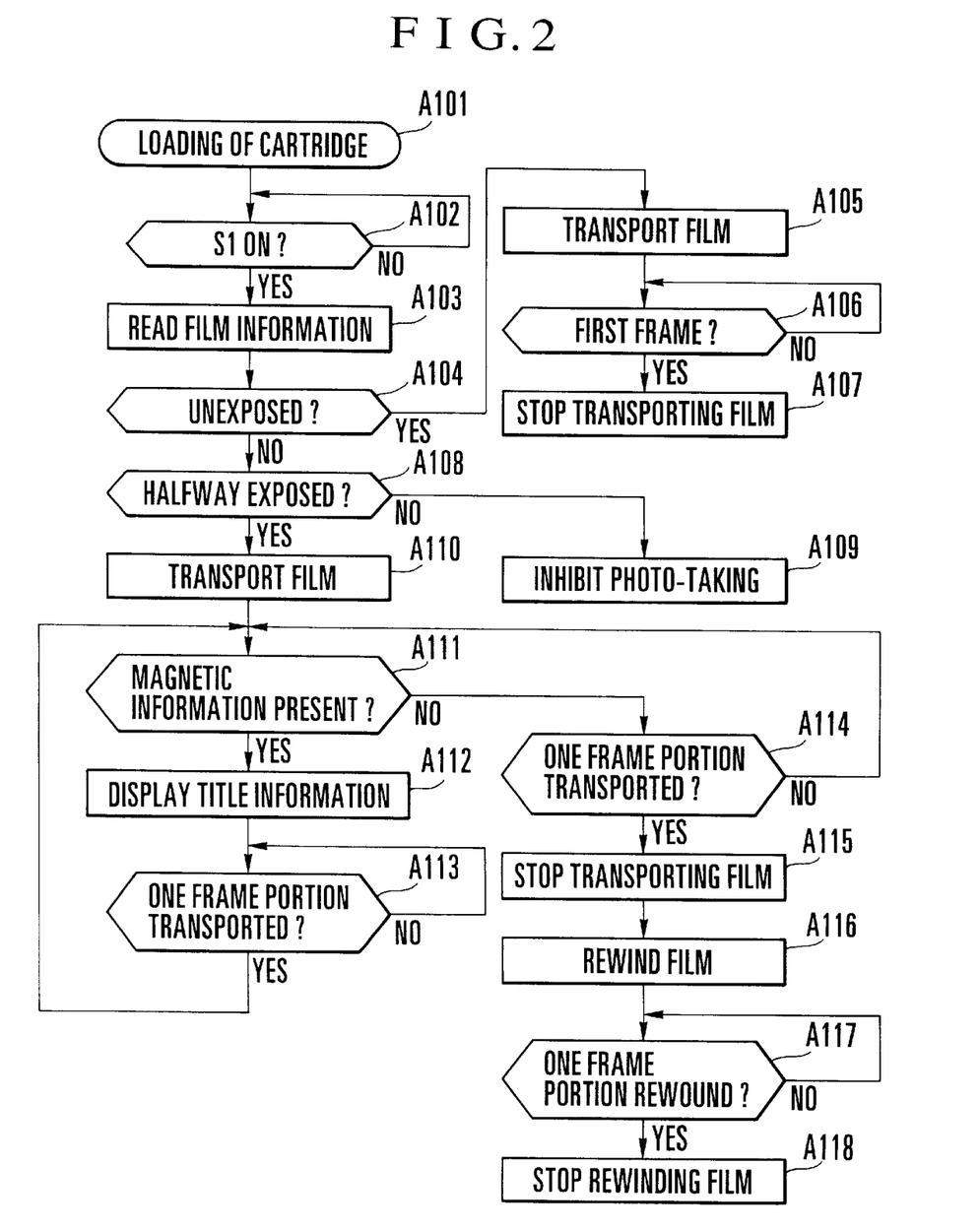
FIG. 2 is a flow chart showing steps to be executed by a control circuit shown in FIG. 1 in loading the camera with a film cartridge.

The actions of the essential parts of the camera arranged as described above are next described through an operation of the control circuit 1 shown in FIG. 1 with reference to FIG. 2, which is a flow chart showing steps to be executed by the control circuit 1.

At a step A101 of FIG. 2, the camera is loaded with a film cartridge. The flow of operation starts and proceeds to a step A102. At the step A102, the flow waits until the film presence-and-absence switch S1 turns on to indicate that the camera is loaded with the film cartridge. When the film presence-and-absence switch S1 turns on, the flow proceeds to a step A103. At the step A103, the film transport motor 2b is caused through the film transport circuit 2a to rotate in the direction of film rewinding. The, bar code information from the film information detecting circuit 3 is checked for information including film exposure information about an "unexposed", "halfway exposed", "exposed" or "developed" state of the film, the sensitivity of the film, and a prescribed number of frames usable for photo-taking.

At the next step A104, a check is made to find if the film exposure information provided on the film cartridge loaded indicates the "unexposed" state. If so, the flow proceeds to a step A105. At the step A105, the film transport motor 2b is caused through the film transport circuit 2a to begin to rotate in the direction of film winding. At a step A106, the output of the film position detecting circuit 4 is checked for the first frame of the film. The check is repeated at the step A106 until the film is transported to bring the first frame to an aperture position of the camera. Upon detection of the first frame, the flow proceeds to a step A107. At the step A107, the film transport action is brought to a stop by cutting off the supply of a current to the film transport motor 2b.

If the film is found at the step A104 to be not "unexposed", the flow proceeds to a step A108. At the step A108, the film exposure information indicated on the film cartridge loaded is checked to find if it shows the "halfway exposed" state. If not, the film is considered to be either "exposed" or "developed". The flow then proceeds to a step A109 to inhibit any photo-taking action on the film.

If the film is found at the step A108 to be in the "halfway exposed" state, the flow proceeds to a step A110 for setting the forefront frame of unexposed frames to the aperture position. At the step A110, the film transport motor 2b is caused through the film transport circuit 2a to begin to rotate in the direction of film winding. At the next step A111, the output of the magnetic reading circuit 6 is checked for the presence of magnetic information on the film. If the presence of magnetic information is found, the flow proceeds to a step A112. At the step A112, title information included in the magnetic information is supplied to the title information display circuit 7a and is then displayed on the LCD 7b. At a step A113, the output of the film position detecting circuit 4 is checked to find if the process of transporting one frame portion of the film (a one frame transport action) has finished. Upon completion of the one frame transport action, the flow returns to the step A111 to repeat the steps described above.

A loop of the steps A111-A112-A113-A111 . . . is thus repeated until a frame which has no record of magnetic information there, i.e., an unexposed frame, is found. During this process of search, title information which is recorded at each of exposed frames is displayed on the LCD 7b one after another to be seen by the user.

When the magnetic information ceases to be found any longer at the step A111, the flow proceeds to a step A114. At the step A114, the output of the film position detecting circuit 4 is checked for the end of the one-frame transport action on the film. Upon detection of the end of one-frame transport action, the flow proceeds to a step A115 to cause the film transport circuit 2a to bring the film transporting action of the film transport motor 2b to a stop. At the next step A116, for rewinding the film as much as its one frame portion by which the film has been excessively transported, the film transport motor 2b is energized in the direction opposite to the film winding direction. Then, the film begins to be rewound as much as one frame portion. At a step A117, the output of the film position detecting circuit 4 is checked for the end of the one-frame rewinding action. Upon completion of the one-frame rewinding action, the flow proceeds to a step A118 to cause the film transport circuit 2a to bring the one frame-rewinding action of the film transport motor 2b to an end by ending the motor energizing process.

According to the arrangement of the first embodiment described above, by only loading a "halfway exposed" film cartridge into the camera, title information which was recorded during photo-taking with use of the "halfway exposed" film cartridge can be displayed. Therefore, title information on exposed frames can be serially displayed one after another while the film is in process of being transported up to the first of unexposed frames. The arrangement, therefore, requires no additional operation and thus saves unnecessary time.

Figure 3:
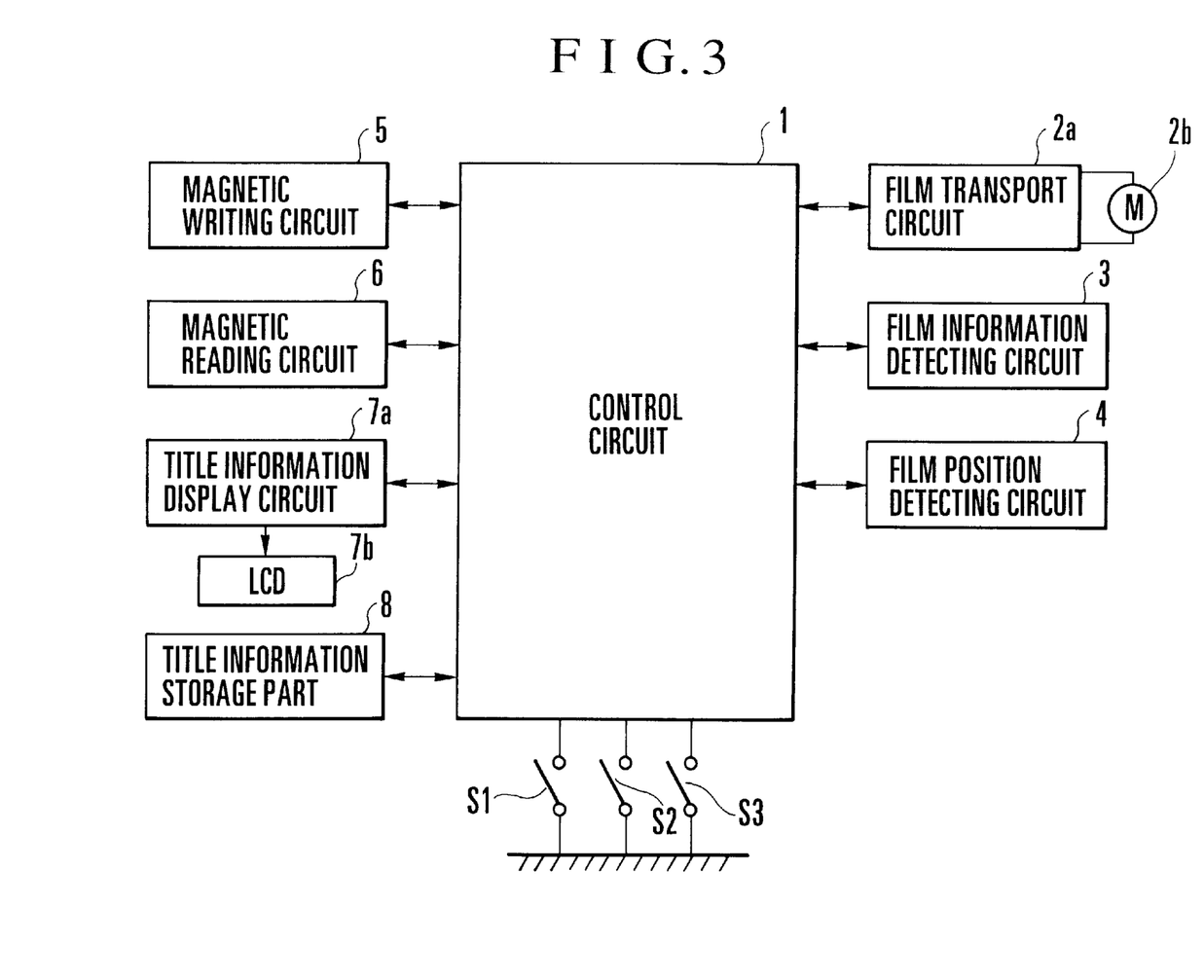
FIG. 3 is a block diagram showing in outline the circuit arrangement of a camera according to a second embodiment of the invention.

FIG. 3 is a block diagram showing the arrangement of essential parts of a camera according to a second embodiment of the invention. The second embodiment is arranged in the same manner as the first embodiment except that the second embodiment includes, in addition to all the parts of the first embodiment, a title information storage part 8 composed of a memory or the like which is arranged to store the title information which has been magnetically recorded. In the arrangement of the second embodiment, the same parts as those of the first embodiment are denoted by the same reference numerals.

Figure 4:
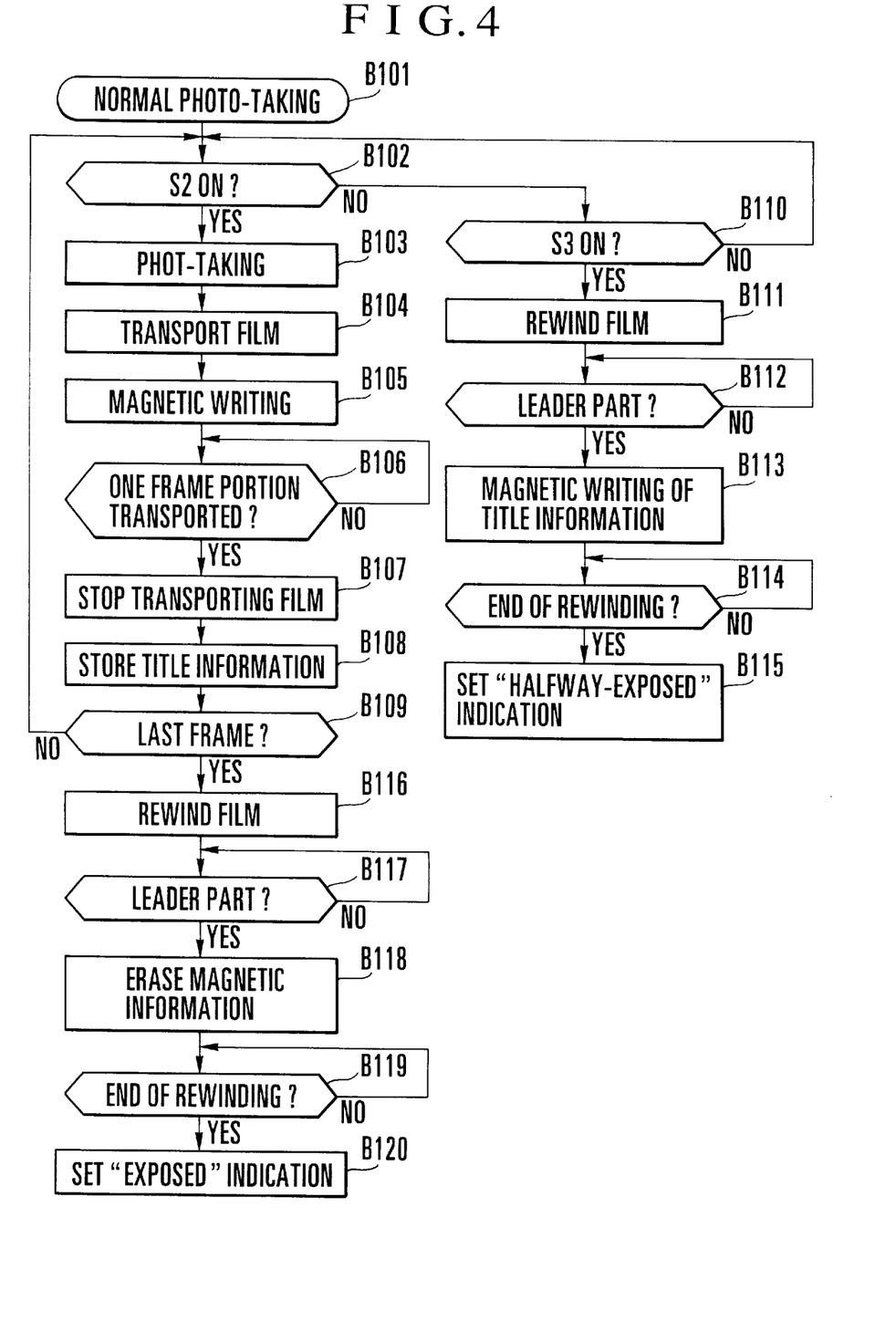
FIG. 4 is a flow chart showing steps to be executed by a control circuit shown in FIG. 3 in performing a normal photo-taking operation.
Figure 5:
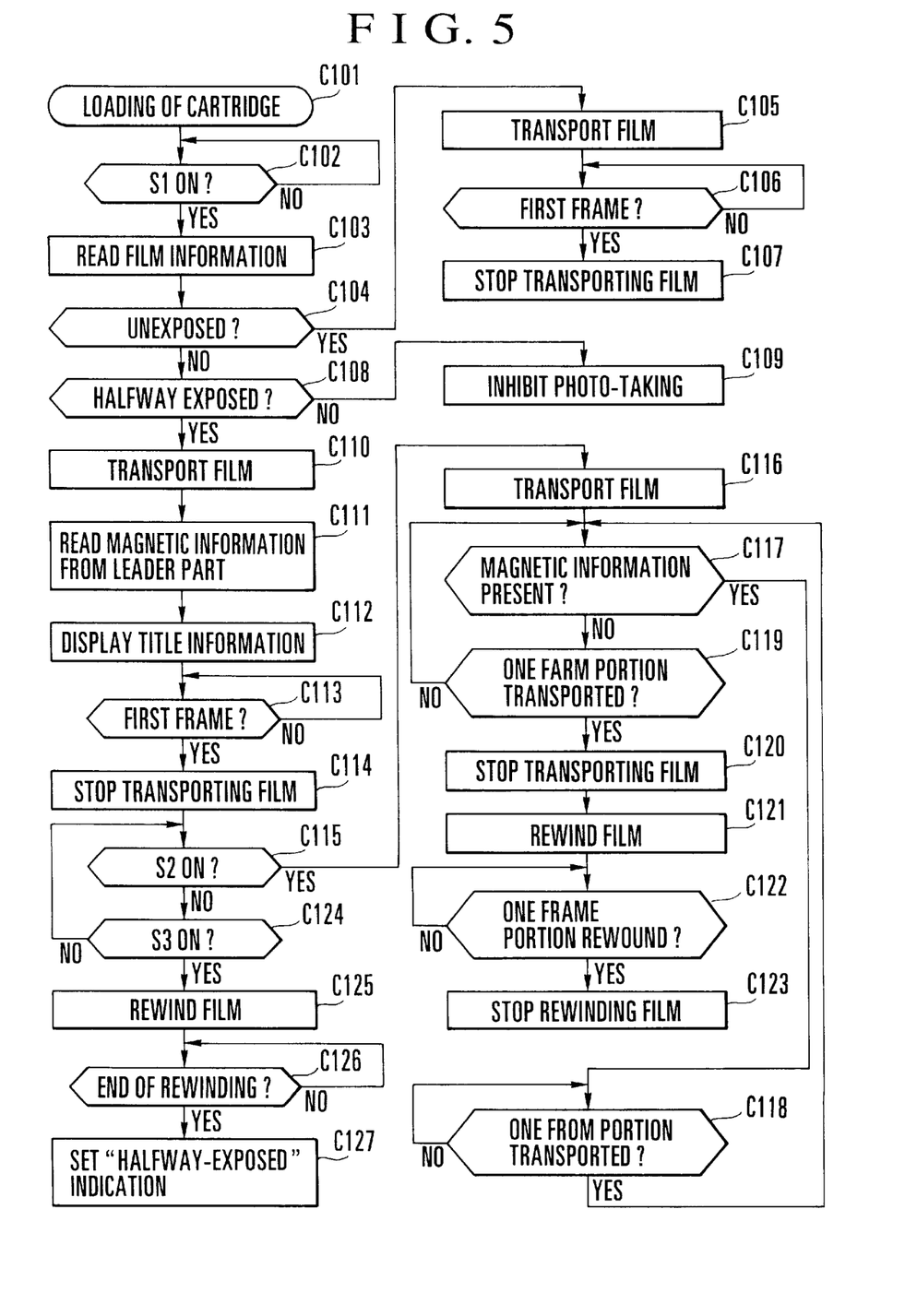
FIG. 5 is a flow chart showing steps to be executed by the control circuit of FIG. 3 in loading the camera with a film cartridge.

FIGS. 4 and 5 are flow charts showing steps to be executed by the control circuit 1 shown in FIG. 3.

FIG. 4 shows steps for a normal photo-taking operation after the camera is loaded with a film cartridge.

At a step B101 of FIG. 4, the camera is loaded with the film cartridge. The first frame portion of a film contained in the film cartridge is pulled out and set in the aperture position of the camera. The flow of operation proceeds to a step B102 in this state. At the step B102, the flow waits until the release switch S2 turns on. The flow proceeds to a step B103 when the release switch S2 turns on. At the step B103, photo-taking actions such as automatic focusing and exposure control actions are carried out. At the next step B104, the film transport circuit 2a and the film transport motor 2b are caused to begin to perform the one frame transport action on the film.

At a step B105, the magnetic writing circuit 5 is caused to magnetically write information of varied kinds including title information on the film. At a step B106, a check is made to find if the one frame transport action has finished. If so, the flow proceeds to a step B107 to stop the film transport circuit 2a and the film transport motor 2b from transporting the film. At a step B108, the title information which has been magnetically recorded on the film is stored in the title information storage part 8. At a step B109, a check is made to find if the frame used for photo-taking is the last frame of the film. If not, the flow returns to the step B102 to repeat the steps mentioned above.

With the steps B102 to B109 repeated, the title information which has lastly recorded is eventually stored in the title information storage part 8. In other words, the title information stored is gradually updated.

Further, if the release switch S2 is found at the step B102 to be not in an on-state, the flow proceeds to a step B110. At the step B110, a check is made to find if the halfway-rewinding switch S3 is in an on-state. If not, the flow returns to the step B102. If so, the flow proceeds to a step B111. At the step B111, the film transport circuit 2a and the film transport motor 2b are caused to begin to rewind the film. At the step B112, the output of the film position detecting circuit 4 is checked to find if the film has been rewound up to the leader part thereof. If so, the flow proceeds to a step B113. At the step B113, the magnetic writing circuit 5 is caused to record, on the leader part of the film, the last title information stored in the title information storage part 8 at the above-stated step B108.

After the step B113, the flow proceeds to a step B114 to wait for completion of the film rewinding after recording the last title information. When the film rewinding finishes, the flow proceeds to a step B115. At the step B115, the film rewinding action is brought to an end while adjusting the output timing of the film information detecting circuit 3 to set the film exposure information on the film cartridge to the "halfway exposed" state.

While the description of the flow chart of FIG. 4 still remains unfinished, actions to be performed in the second embodiment at the time of loading the camera with a film cartridge are next described below with reference to the flow chart of FIG. 5.

In the flow chart of FIG. 5, steps C101 to C109 are identical with the steps A101 to A109 of FIG. 2 which shows actions of the first embodiment described in the foregoing. The steps C101 to C109 are, therefore, omitted from the following description.

Referring to FIG. 5, when the camera is found at the step C108 to be loaded with the film cartridge which is in the "halfway exposed" state, the flow proceeds to a step C110. At the step C110, the film transport circuit 2a and the film transport motor 2b are caused to begin to transport the film. At a step C111, magnetic information recorded on the leader part of the film at the step B113 of FIG. 4 is read by the magnetic reading circuit 6. At a step C112, the title information display circuit 7a is caused to display on the LCD 7b the last title information obtained before the halfway film rewinding. After that, the flow proceeds to a step C113 to transport the film until the first frame is detected by the film position detecting circuit 4. At a step C114, the film transport action is put to a pause. Under this condition, since the last title information obtained before the film rewinding is displayed on the LCD 7b, the display of the title information enables the user to recall the details of shots taken with this film cartridge by spending a sufficiently long time.

With the title information display reviewed by the user, if it is desired to continue the photo-taking operation on the film cartridge, the user may push the release button S2. When the release button S2 is found at the step C115 to have turned on, the flow proceeds to a step C116. At the step C116, the film transport circuit 2a and the film transport motor 2b are caused to continue the film transport action. After that, steps C117 to C123 are executed in the same manner as the steps A111 to A118 of the first embodiment described in the foregoing, except that the title information display is not made for every frame in this instance.

With the title information reviewed and, after that, if it is desired to take the film cartridge out from the camera without resuming the photo-taking operation on the film, the halfway-rewinding switch S3 is pushed instead of pushing the release switch S2. In this case, the release switch S2 remains in its off-state and the halfway-rewinding switch S3 turns on. Therefore, the flow of operation proceeds in the order of steps C115-C124-C125. At the step C125, the film begins to be rewound. At the next step C126, when the end of the film rewinding is detected, the flow proceeds to a step C127. At the step C127, the film exposure information on the film cartridge is set to the "halfway exposed" state.

Referring again to the flow chart of FIG. 4, when the last frame of the film is found at the step B109 to have been used for photo-taking, the flow proceeds to a step B116. At the step B116, the film begins to be rewound. At a step B117, a check is made until the film is found to be rewound to the leader part thereof. At the next step B118, redundant magnetic title information written at the step B113 is erased by the magnetic writing circuit 5. At a step B119, the flow waits for the end of the film rewinding. When the end of the film rewinding is found, the flow proceeds to a step B120. At the step B120, the film exposure information on the film cartridge is set to the "exposed" state.

Since the second embodiment described above is arranged to record on the leader part of the film the last title information obtained before the halfway film rewinding, a previous photo-taking state can be confirmed within a short period of time by only loading a halfway-exposed film cartridge and sending out the leader part of the film.

Further, the last title information obtained before the halfway film rewinding is always recorded on the leader part of the film, as mentioned above. The title can be recorded on the leader part in any characters that are desired by the user or by selecting some of popular titles such as "NEW YEAR'S DAY", "SUMMER VACATION", "CHRISTMAS", etc., so that the details of shots taken on the film can be easily recalled.

Figure 6:
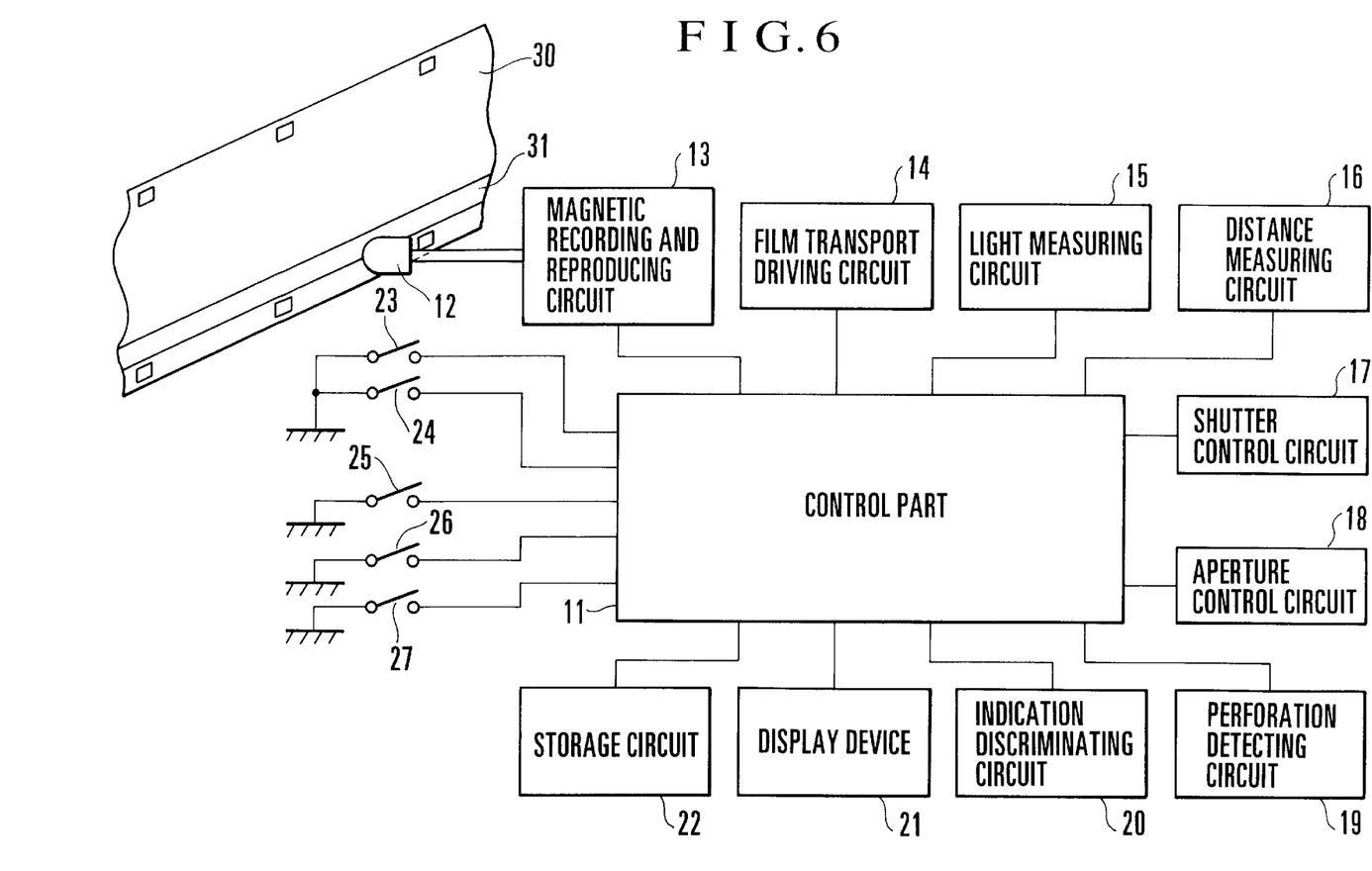
FIG. 6 is a block diagram showing in outline the electric circuit arrangement of a camera according to a third embodiment of the invention.

FIG. 6 is a block diagram showing the electrical circuit arrangement of a camera according to a third embodiment of the invention. Referring to FIG. 6, a control part 11 is composed of a microcomputer, etc., and is arranged to provide overall control of the camera. A magnetic head 12 is arranged to write and read information on and from a magnetic recording part 31 provided on a film 30. A magnetic recording and reproducing circuit 13 is arranged to control the magnetic head 12.

A film transport driving circuit 14 is arranged to drive a film transport motor (not shown) arranged to wind and rewind the film 30. The camera is further provided with a light measuring circuit 15, a distance measuring (focus detecting) circuit 16, a shutter control circuit 17, an aperture control circuit 18, a perforation detecting circuit 19 which is arranged to count perforations of the film 30 detected by a photo-reflector or the like, and an indication discriminating circuit 20 which is arranged to discriminate an indication provided on a film cartridge (not shown) showing the using state of the film 30 loaded.

A display device 21 is arranged to display photo-taking conditions of varied kinds of the camera, including an aperture value, a shutter speed, a film sensitivity, a date, a title, etc., or various kinds of warning, or information read out from the magnetic recording part 31 of the film 30. A storage circuit 22 is arranged to store information read out from the magnetic recording part 31 of the film 30 by the magnetic head 12.

A switch 23 (SW1) is provided for starting a light measuring action. A switch 24 (SW2) is provided for starting a photo-taking operation. These switches 23 and 24 (SW1 and SW2) are arranged respectively to be turned on by a first operation stroke and a second operation stroke which follows the first stroke of operation on one and the same switch member.

A halfway-rewinding switch 25 is provided for rewinding the film 30 in a state where the film 30 has been used for photo-taking only halfway of its whole length. A cartridge switch 26 is arranged to detect that the camera is loaded with the film cartridge. A cartridge chamber lid switch 27 is arranged to detect the closing of the lid of a cartridge chamber into which to load the film cartridge.

Figure 7:
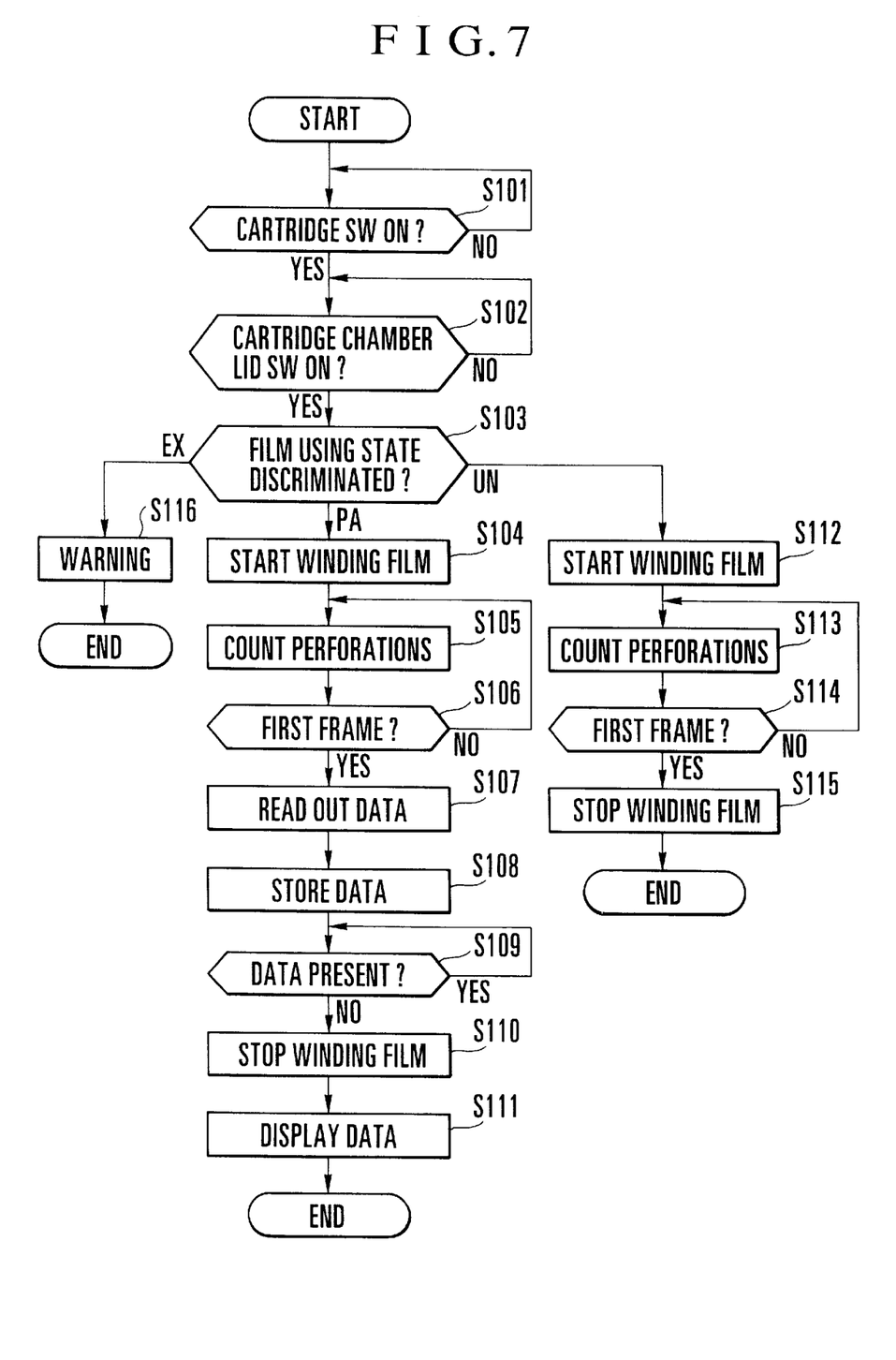
FIG. 7 is a flow chart showing steps to be executed by a control part shown in FIG. 6.
Figure 8:
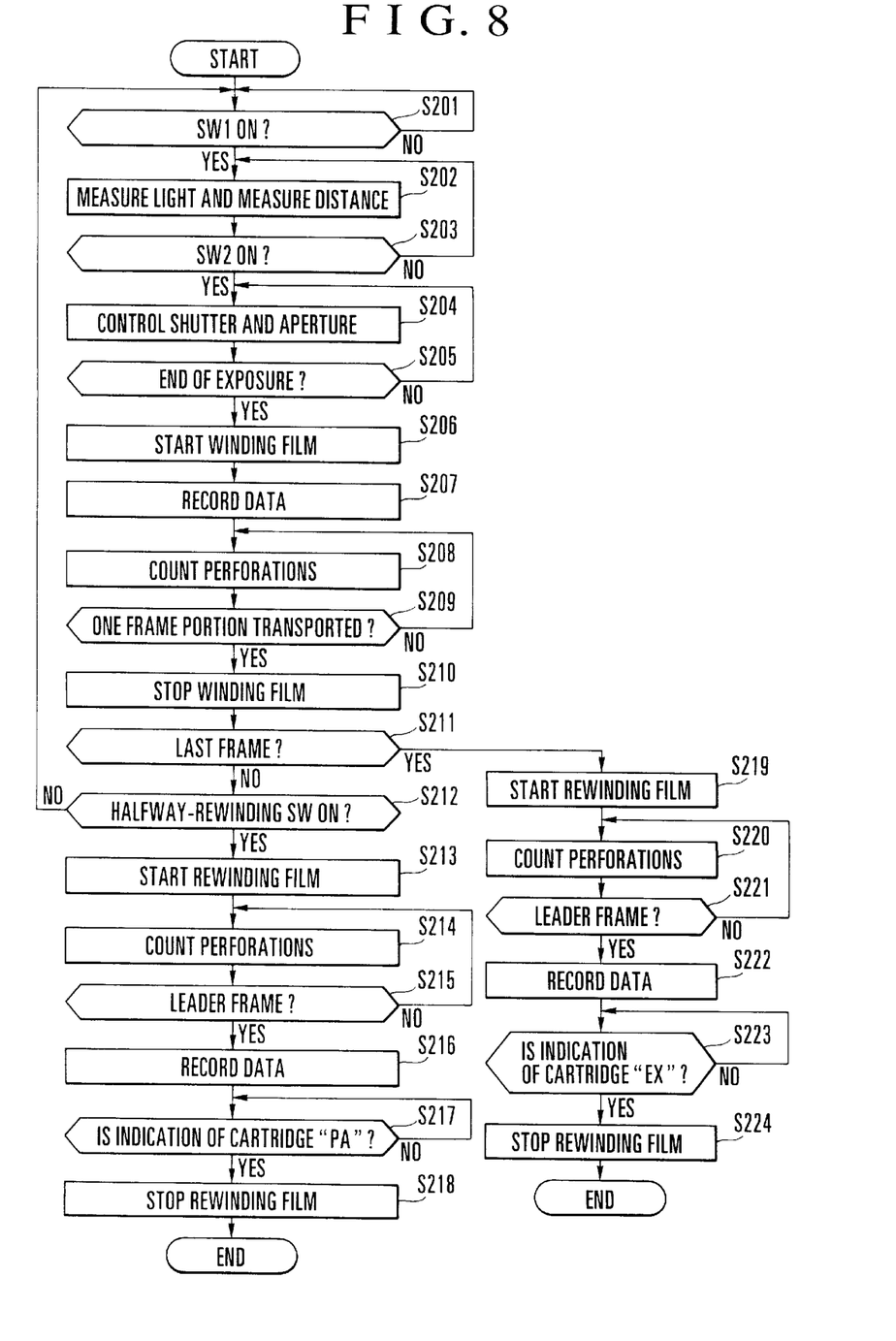
FIG. 8 is a flow chart showing steps to be executed by the control part shown in FIG. 6.

FIGS. 7 and 8 are flow charts showing the operation of the control part 6 shown in FIG. 6. FIG. 7 shows a flow of operation from loading the camera with a film cartridge up to completion of preparation for photo-taking. At a step S101 of FIG. 7, the cartridge switch 26 turns on when the film cartridge is loaded into the cartridge chamber. At a step S102, the cartridge chamber lid switch 27 turns on when the lid of the cartridge chamber is closed. At a step S103, the indication discriminating circuit 20 is caused to distinguish an indication provided on the film cartridge to indicate the using state of the film 30. If the indication is found to indicate that the film is in an exposed state "EX", i.e., all the frames of the film have been used for photo-taking, the flow of operation proceeds to a step S116 to cause the display device 21 to make a warning display to show that the film 30 has already been completely used for photo-taking and is not usable.

If the indication on the film cartridge is found at the step S103 to indicate that the film is in an unused (unexposed) state "UN", the flow proceeds to a step S112. At the step S112, the film transport driving circuit 14 is caused to drive a film transport motor (not shown), so that an automatic loading (AL) action on the film 30 begins. At the next step S113, the perforation detecting circuit 19 begins to count perforations provided in the film 30. At a step S114, a check is made for completion of the automatic film loading (AL) action by finding, from the count value of perforations, if the first frame portion of the film 30 has come to face an aperture part of the camera. If not, the flow returns to the step S113. If so, the flow proceeds to a step S115. At the step S115, the film transport driving circuit 14 is caused to bring the rotation of the film transport motor to a stop.

Further, if the indication on the film cartridge is found at the step S103 to indicate that the film 30 is in a partially exposed state (PA) which means that only some of available frames were used for photo-taking and the film has been rewound halfway in a previous photo-taking operation, the flow proceeds to a step S104. At the step S104, the film transport driving circuit 14 is caused to drive the film transport motor. The film transport motor then begins to perform a leader-finding film winding action on the film 30 to find the forefront frame of unexposed frames. At a step S105, the perforation detecting circuit 19 is caused to begin to count the perforations of the film 30. At a step S106, the count value of perforations is checked to find if the first frame of the film 30 (the first frame of exposed frames) has come to face the aperture part of the camera. If not, the flow returns to the step S105. If so, the flow proceeds to a step S107.

At the step S107, the magnetic recording and reproducing circuit 13 is caused to drive the magnetic head 12. The magnetic head 12 then reads data written in the magnetic recording part 31 corresponding to the first frame, including a date, time, an individual frame title, a film roll title, a shutter speed, an aperture value, etc. At a step S108, the data read out is stored in the storage circuit 22. At a step S109, a check is made to find if any data is written in the magnetic recording part 31 corresponding to each of the second frame and frames subsequent thereto. If data is thus found to be written in at one frame, the check is repeated for another frame, by continuing the leader-finding film winding action, until an unexposed frame at which no data is written is found. When the unexposed frame is thus found, the flow proceeds to a step S110. At the step S110, the film transport driving circuit 14 is caused to bring the rotation of the film transport motor to a stop. At the next step S111, the data stored in the storage circuit 22 is displayed by the display device 21.

As described above, according to the third embodiment, when the partially exposed film (PA) is reloaded, data magnetically recorded at the first of exposed frames is read out and displayed while the leader-finding film winding action is in process. Therefore, the data of the first exposed frame of the film 30 can be made to accurately coincide with the data on display without fail. The user is thus enabled to accurately know the objects and purposes for which shots were taken by the previous photo-taking operation.

FIG. 8 is a flow chart showing the flow of operation ranging from the photo-taking action to the film rewinding action of the camera in the third embodiment. At a step S201 of FIG. 8, a check is made to find if the light measuring switch 23 is in an on-state. If so, the flow proceeds to a step S202. At the step S202, the light measuring circuit 15 and the distance measuring circuit 16 are actuated to obtain light information and distance information. A light measuring action and a distance measuring action are performed on the basis of the light information and distance information thus obtained. At a step S203, a check is made to find if the photo-taking start switch 24 is in an on-state. If so, the flow proceeds to a step S204. At the step S204, the shutter control circuit 17 and the aperture control circuit 18 are actuated to start a photo-taking (exposure) operation.

At a step S205, a check is made to find if the photo-taking operation has finished. If so, the flow proceeds to a step S206. At the step S206, the film transport driving circuit 14 is caused to drive the film transport motor to start a one-frame winding action on the film 30. Incidentally, the end of the photo-taking operation can be detected, for example, by detecting a signal which is outputted upon completion of the travel of a trailing shutter blade.

The flow proceeds to a step S207 while the one-frame winding action on the film 30 is in process. At the step S207, data of photo-taking conditions such as a shutter speed, an aperture value, time, a title, etc., is written in the magnetic recording part 31 corresponding to the frame for which the photo-taking operation has finished. At a step S208, the perforation detecting circuit 19 is caused to count the perforations of the film 30. At a step S209, the count value of perforations is checked to find if the one-frame winding action on the film 30 has finished. If not, the one-frame winding action is allowed to be carried on. If so, the flow proceeds to a step S210. At the step S210, the film transport driving circuit 14 is caused to bring the rotation of the film transport motor to a stop.

At the next step S211, a check is made to find if the frame which has been last used for photo-taking is the last frame of the film 30. If not, the flow proceeds to a step S212. At the step S212, a check is made to find if the halfway-rewinding switch 25 is in an on-state. If not, the flow returns to the step 201 to repeat the steps S201 to S212. If so, the flow proceeds to a step S213. At the step S213, the film transport driving circuit 14 is caused to drive the film transport motor to start a film rewinding action on the film 30.

After the start of the film rewinding action, the flow proceeds to a step S214. At the step S214, the perforation detecting circuit 19 is caused to start counting the perforations of the film 30. At a step S215, the count value of perforations is checked to find if a frame now facing the aperture part of the camera is a leader frame which is located between the fore end part and the first frame portion of the film 30 and is dedicated to magnetic recording. If not (if the frame is still one of exposed frames), the film rewinding action and the perforation counting action are allowed to be carried on. If the frame currently facing the aperture part is found to be the frame dedicated to magnetic recording, the flow proceeds to a step S216. At the step S216, the magnetic recording and reproducing circuit 13 is caused to drive the magnetic head 12. The magnetic head 12 then writes common information, such as a title, a date, time, the ID number of the camera, which applies to all frames of the film 30 in common, in the magnetic recording part 31 corresponding to the frame dedicated to magnetic recording.

After the data is recorded at the step S216 on the frame dedicated to magnetic recording, the flow proceeds to a step S217. At the step S217, the indication made by a film using state indicating means which rotates together with the spool of the film cartridge is checked by the indication discriminating circuit 20 to find if the indication shows the partially exposed state PA. If so, the flow proceeds to a step S218. At the step S218, the film transport driving circuit 14 is caused to bring the rotation of the film transport motor to a stop.

If the frame used for photo-taking immediately before is found at the step S211 to be the last frame of the film, the flow proceeds to a step S219. At the step S219, the film transport driving circuit 14 is caused to drive the film transport motor to start film rewinding. After the start of the film rewinding, the flow proceeds to a step S220. At the step S220, the perforation detecting circuit 19 is caused to start counting the perforations of the film. At a step S221, the count value of perforations is checked to find if the frame currently facing the aperture part of the camera is the frame dedicated to magnetic recording. If not (if the frame is still an exposed frame), the rewinding and perforation counting actions are allowed to continue. If so, the flow proceeds to a step S222. At the step S222, the magnetic recording and reproducing circuit 13 is caused to drive the magnetic head 12. The magnetic head 12 then writes the information which commonly applies to all frames of the film, in the magnetic recording part 31 corresponding to the frame dedicated to magnetic recording. The flow then proceeds to a step S223 to cause the indication discriminating circuit 20 to find if the film using state indicating means of the film cartridge indicates the exposed state EX. If so, the flow proceeds to a step S224 to cause the film transport driving circuit 14 to bring the rotation of the film transport motor to a stop.

According to the third embodiment described above, the data of the first exposed frame at the step S111 of FIG. 7 is displayed after completion of the leader-finding film winding action at the step S110. However, this arrangement may be changed to let the user know the film data as early as possible by displaying the above-stated data before completion of the leader-finding film winding action.

Further, the arrangement of the third embodiment for displaying the data of the first photographed frame may be changed to display the data of the last photographed frame or to display both the data of the first and last photographed frames by changing the positions of the steps S107 and S108. It is also possible to display the data of the frame dedicated to magnetic recording.

Figure 9:
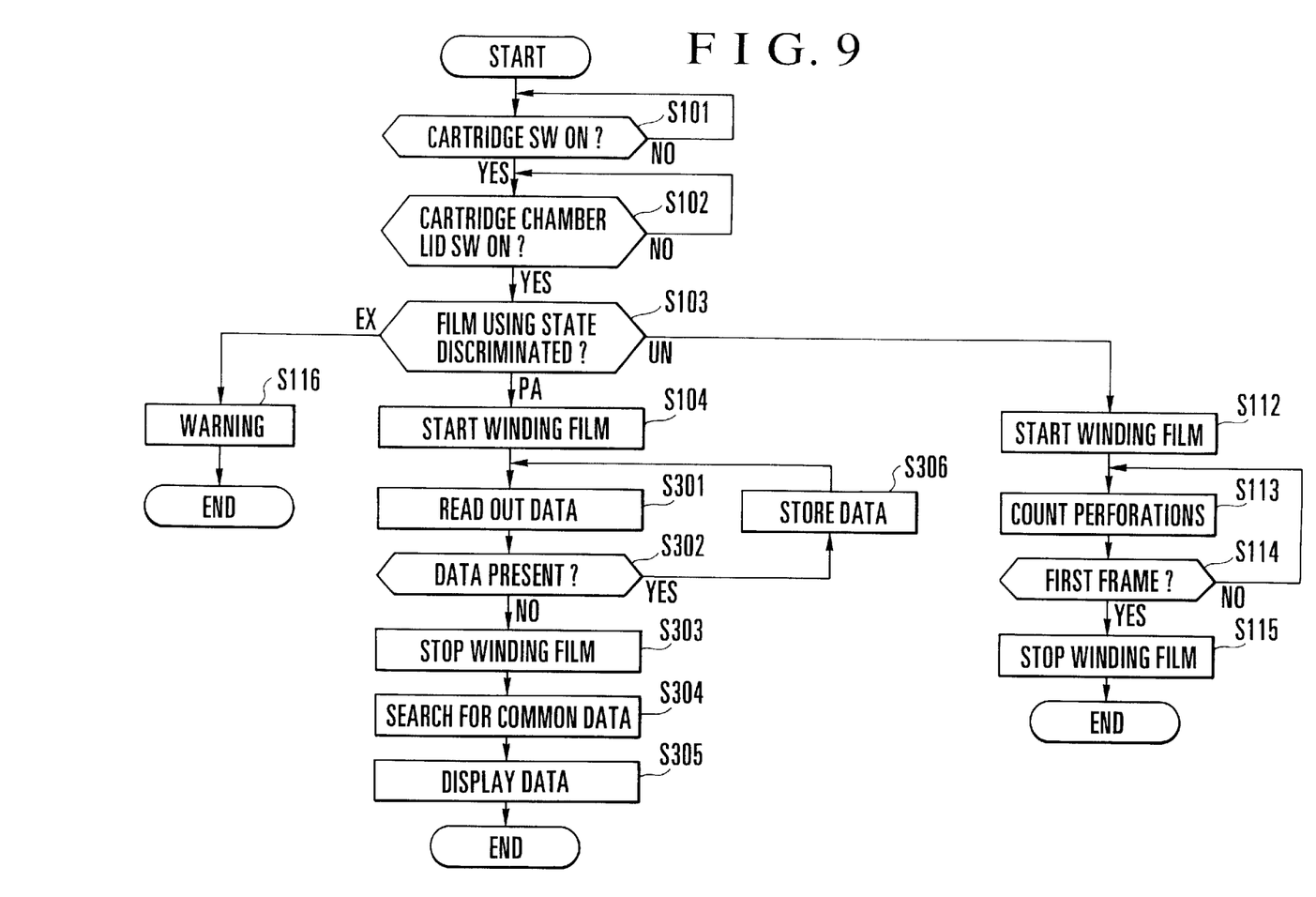
FIG. 9 is a flow chart showing steps to be executed by the control part shown in FIG. 6 according to a fourth embodiment of the invention.

FIG. 9 is a flow chart showing an operation of a control part of a camera according to a fourth embodiment of the invention. The flow of operation covers actions to be performed from loading the camera with a film cartridge to completion of preparation for photo-taking. The electrical circuit arrangement and the actions to be performed for photo-taking and rewinding the film are the same as those of the third embodiment described above. In the flow chart of the fourth embodiment, the same step numbers as those of the third embodiment are used for the steps from loading the film cartridge to the end of preparation for photo-taking.

In the case of the fourth embodiment, the flow of operation proceeds to a step S301 of FIG. 9 after the start of film winding for finding the forefront frame of unexposed frames at the step S104. At the step S301, the magnetic recording and reproducing circuit 13 is caused to drive the magnetic head 12 to read data written in the magnetic recording part 31 corresponding to each of exposed frames of the film. At a step S302, a check is made for any data written in the magnetic recording part 31 of each frame. If any data is found, the flow proceeds to a step S306. At the step S306, the data read out at the step S301 is stored in the storage circuit 22, and the flow returns to the step S301. At the steps S301, S302 and S306, data of all exposed frames can be stored in the storage circuit 22.

When no data is found at the step S302, the flow proceeds to a step S303. At the step S303, the film transport driving circuit 14 is caused to bring the rotation of the film transport motor to a stop. The action of searching or finding the forefront frame of unexposed frames then comes to an end, and the flow proceeds to a step S304. At the step S304, a search is made for such common data, such as a date, an individual frame title, etc., that applies in common to the largest number of exposed frames among all the exposed frames. At the next step S305, the display device 21 is caused to display the common data found by the above search action.

As described above, according to the arrangement of the fourth embodiment, when a partially exposed film (PA) which has been rewound halfway before complete use thereof is reloaded, the magnetically recorded data of all exposed frames is read out while the film is in process of the leader-finding action. Then, data applicable in common to the largest number of frames among all the exposed frames is displayed. Therefore, even if the partially exposed film was used for taking shots at a variety of scenes, the arrangement enables the user to accurately know how, why and when the shots of main scenes were taken.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while each of the embodiments is arranged to display information read out from the magnetic recording part of the film either during the process of film winding or after completion of film winding, this arrangement may be changed to display the information read out from the magnetic recording part of the film during the process of film rewinding or after completion of film rewinding.

Further, according to the invention, the information read out from the magnetic recording part of the film may be displayed by converting the information read out into some information corresponding to the read information, instead of displaying it as it is.

The invention is applicable to an image recording medium other than a film.

The invention is applicable also to an apparatus arranged to record or read information on or from a film in an electronic, optical manner, or some other manner, instead of magnetic recording and reading.

The software arrangement and the hardware arrangement of each of the embodiments disclosed may be interchanged and replaced with each other as desired.

The invention may be carried out by combining as necessary the embodiments or their technological elements described in the foregoing.

The invention applies to cases where either the whole or a part of claims or the arrangement of each embodiment described forms one apparatus or is used in combination with some other apparatuses or as a component element of some other apparatus.

Further, the invention is applicable to cameras of varied kinds, such as a single-lens reflex camera, a lens-shutter type camera, a video camera, etc., optical apparatuses other than cameras, such as an image reproducing apparatus and a viewer (film viewer), devices adapted for cameras, optical apparatuses and other apparatuses, and component elements forming these apparatuses and devices.

What is claimed is:

1. A camera adapted for a film cartridge containing a film having a magnetic layer provided thereon, comprising:
   (a) a detection device which detects a state of use of said film contained in said film cartridge loaded in said camera,
   (b) a transport circuit which transport said film when said detection device detects that said film contained in the cartridge is a partially used film,
   (c) a reading device which reads out a magnetic information recorded in said magnetic layer of said film during the transport of said film by said transport circuit, and
   (d) a display device which makes a display corresponding to the information read out by said reading device.

2. A camera according to claim 1, wherein, after the partially used film has been transported up to an unused frame portion thereof, said display device makes a display corresponding to the information read out by said reading device.

3. A camera according to claim 1, further comprising:
   said display device does not operate when said detection device determines that the film is not a partially used film.

4. A camera according to claim 1, wherein said reading device includes a magnetic reading device.

5. A camera according to claim 1, wherein said display device displays title information recording on the magnetic layer of the film.

6. A camera according to claim 1, wherein said display device displays information corresponding to at least one of a photographing date and a photographing time recorded on the magnetic layer of the film.

7. A camera according to claim 1, wherein said display device displays information recorded on the magnetic layer of the film, as it stands.

8. A camera according to claim 1, wherein said display device makes a display corresponding to information recorded on the magnetic layer of an exposed frame of the film.

9. A camera according to claim 1, wherein said display device makes a display corresponding to information recorded on the magnetic layer of each frame of the film.

10. A camera according to claim 1, wherein said display device makes a display corresponding to information recorded on the magnetic layer of a leader part of the film.

11. A camera according to claim 1, wherein said display device makes a display corresponding to information recorded on the magnetic layer of a predetermined frame of the film.

12. A camera according to claim 1, wherein said display device makes a display corresponding to information recorded on the magnetic layer of a last exposed frame of the film.

13. A camera according to claim 1, wherein said display device makes a display corresponding to information recorded on the magnetic layer of a first exposed frame of the film.

14. A camera according to claim 1, wherein said display device makes a display corresponding to information recorded on the magnetic layer of each of a first exposed frame and a last exposed frame of the film.

15. A camera according to claim 1, wherein said display device makes a display corresponding to information common to most of all exposed frames among information recorded on the magnetic layer of every exposed frame of the film.

16. A camera according to claim 1, wherein said display device makes a display corresponding to information recorded on the magnetic layer of an area exclusively-used for information recording of the film.

17. A camera according to claim 1, wherein said display device displays title information common to all frames recorded on the magnetic layer of the film.

18. A camera according to claim 1, further comprising:
    a recording device which records information on the magnetic layer of the film, said recording device, when the film is rewound in a partially used state, recording predetermined information on the magnetic layer of a leader part of the film.

19. A camera according to claim 1, further comprising:
    a recording device which records information on the magnetic layer of the film, said recording device, when the film is rewound in a partially used state, recording title information on the magnetic layer of a leader part of the film.

20. A camera according to claim 1, further comprising:
    a recording device which records information on the magnetic layer of the film, said recording device, when the film is rewound in a partially used state, recording title information of a last exposed frame obtained by photography before rewinding of the film, on the magnetic layer of a leader part of the film.

21. A camera according to claim 20, further comprising:
    a storage device which stores title information corresponding to a frame obtained by photography, so as to enable said recording device to record the title information of the last exposed frame.

22. A camera according to claim 1, further comprising:
    a transport circuit which transports the partially used film up to an unused frame portion thereof, said transport circuit temporarily stopping transporting the film before transporting the film up to the unused frame portion thereof,
    said display device becoming operative when said transport circuit is temporarily stopping transporting the film.

23. A camera according to claim 22, wherein said transport circuit, after temporarily stopping transporting the film, rewinds the film without transporting the film up to the unused frame portion thereof, in response to a predetermined operation.

24. A camera according to claim 1, further comprising:

an erasing device which, when the film is rewound in a fully used state, erases information recorded on the magnetic layer of a leader part of the film.

25. A camera according to claim 1, further comprising:

an erasing device which, when the film is rewound in a fully used state, erases title information recorded on the magnetic layer of a leader part of the film.

26. A camera adapted for a film having an information recording part, comprising:

(A) a film use detecting device adapted to detect whether a film loaded into said camera is in a condition of being unexposed, partially exposed, fully exposed or developed and generating an output signal indicative of the detected film condition;

(B) a reading device for reading out information recorded on the information recording part of the film loaded into said camera; and (C) a display device which makes a display corresponding to the information read out by said reading device when said detecting device output signal indicates the detected film condition to be the partially exposed condition and does not make a display corresponding to the information read out by said reading device when said detecting device output signal indicates the detected film condition not to be the partially exposed condition.

* * * * *

UNITED STATES PATENT AND TRADEMARK OFFICE
CERTIFICATE OF CORRECTION

PATENT NO. : 6,185,377 B1 Page 1 of 1
APPLICATION NO. : 09/113894
DATED : February 6, 2001
INVENTOR(S) : Hideo Taka et al.

It is certified that error appears in the above-identified patent and that said Letters Patent is hereby corrected as shown below:

Col. 8, line 41, delete "is.in" and insert -- is in --.

Signed and Sealed this

Thirty-first Day of October, 2006

JON W. DUDAS
*Director of the United States Patent and Trademark Office*